United States Patent
Hata

(10) Patent No.: US 8,743,236 B2
(45) Date of Patent: Jun. 3, 2014

(54) IMAGE PROCESSING METHOD, IMAGE PROCESSING APPARATUS, AND IMAGING APPARATUS

(75) Inventor: Tetsuya Hata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 240 days.

(21) Appl. No.: 12/973,656

(22) Filed: Dec. 20, 2010

(65) Prior Publication Data

US 2011/0157411 A1 Jun. 30, 2011

(30) Foreign Application Priority Data

Dec. 25, 2009 (JP) ................................. 2009-295434

(51) Int. Cl.
*H04N 9/73* (2006.01)

(52) U.S. Cl.
USPC ..................... 348/223.1; 348/222.1; 382/167; 382/172

(58) Field of Classification Search
USPC ......... 348/223.1, 222.1, 225.1, 655; 382/168, 382/167, 172; 358/518, 520, 522
See application file for complete search history.

(56) References Cited

U.S. PATENT DOCUMENTS

| 7,215,812 | B1* | 5/2007 | Masaki | 382/167 |
| 2001/0012399 | A1* | 8/2001 | Tohyama et al. | 382/167 |
| 2005/0168596 | A1* | 8/2005 | Ito et al. | 348/222.1 |
| 2010/0226572 | A1* | 9/2010 | Adachi | 382/167 |

FOREIGN PATENT DOCUMENTS

| CN | 1856117 A | 11/2006 |
| JP | 2000-259372 A | 9/2000 |

* cited by examiner

*Primary Examiner* — Sinh Tran
*Assistant Examiner* — Paul Berardesca
(74) *Attorney, Agent, or Firm* — Canon U.S.A., Inc. IP Division

(57) ABSTRACT

The present invention is directed to an image processing apparatus wherein a discrimination whether an input image is a vivid color scene can be made to match a perception or an intention of a human.

The image processing apparatus is characterized in acquiring image data, generating a hue distribution of the image data, setting a discrimination condition according to a degree of spreading of a color distribution in the hue distribution and discriminating whether the image of the image data is a vivid color scene under the discrimination condition, and outputting the discrimination result upon discrimination.

18 Claims, 14 Drawing Sheets

IMAGE PROCESSING METHOD, IMAGE PROCESSING APPARATUS, AND IMAGING APPARATUS

BACKGROUND OF THE INVENTION

1. Field of the Invention

The present invention relates to an image processing method for discriminating a scene of an input image and performing image processing according to the scene thus discriminated, an image processing apparatus thereof, and an imaging apparatus thereof.

2. Description of the Related Art

Conventionally, there is an image processing apparatus that discriminates a scene of an image or a type of an object according to the scene (i.e., the type of the object) thus discriminated.

For example, Japanese Patent Laid-open Publication No. 2000-259372 discloses an image output apparatus that discriminates whether the input image data is a vivid color scene (i.e., a vivid object) and outputs the image data at high resolution in a case where the image data is the vivid color scene.

In the conventional technique disclosed in the above described Japanese Patent Laid-open Publication No. 2000-259372, whether the image data is the vivid color scene is determined according to whether the number of pixels having a high chroma is more than a predetermined threshold or less than the predetermined threshold.

However, in the conventional method that discriminates the vivid color scene based only on chroma information of the image, a discrimination result of the scene sometimes does not match a feeling of a user, i.e., a feeling of a human.

For example, in a case where an image includes the many number of colors, the user tends to view the image as the vivid color scene even if the chroma of each of the colors is low, in comparison with a case that the image includes less colors.

There is a case where the user does not intend to capture a vivid color scene even if the image includes a lot of high chroma pixels. An example of such case is a case that an object is captured with a background, e.g., with a wall behind an object, that is uniformly painted with a high chroma color. As described above, even with the same chroma, there is a case where the user tends to view the image as the vivid color scene whereas there is a case where the user does not view the image as the vivid color scene. In a case as described above, it is hard to discriminate the scene according to the user's views or the user's intention according to the conventional discrimination method.

SUMMARY OF THE INVENTION

The present invention is directed to an image processing apparatus that can discriminate whether an input image is a vivid color scene, which matches more a perception or an intention of a human.

According to the present invention, an image processing apparatus can discriminate whether an image is a vivid color scene that matches more of a view of a human by correcting a chroma according to a hue or a luminance of the input image.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

An image processing apparatus according to a first exemplary embodiment is described below with reference to FIGS. 1 through 6.

Figure 1:
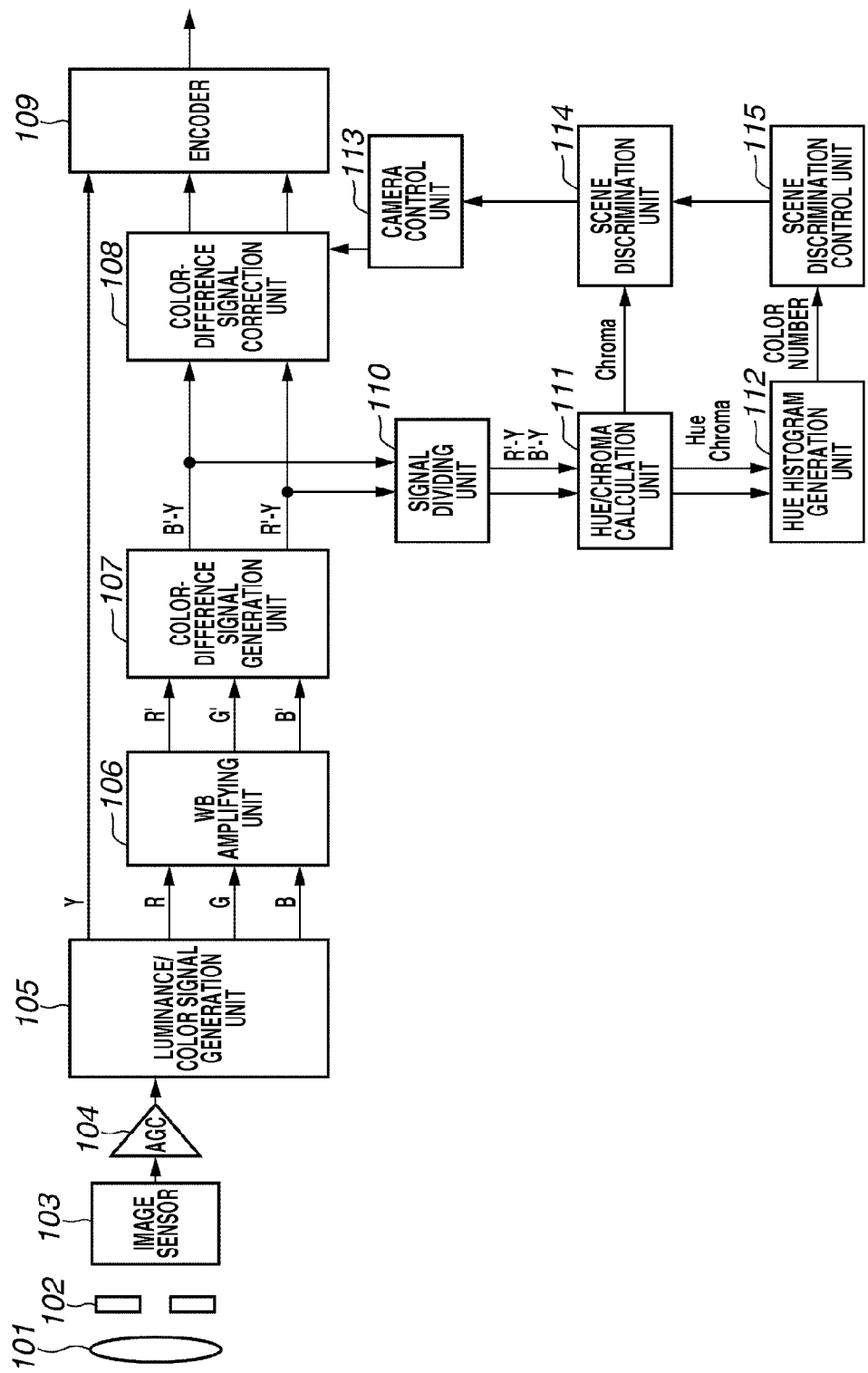
FIG. 1 is a block diagram illustrating a configuration of an imaging apparatus according to a first exemplary embodiment.

FIG. 1 is a block diagram illustrating a configuration of an imaging apparatus as an example of an image processing apparatus that includes a scene discrimination function according to a first exemplary embodiment and performs image correction processing according to a scene. In FIG. 1, a lens 101 forms an image of a light flux from an object. An iris 102 stops down the light flux from the lens 101 when the light flux is guided into the image sensor. An image sensor 103 photoelectrically converts the entered light flux to output the light flux in the form of an image signal. An automatic gain control amplifier (AGC) 104 amplifies the signal from the image sensor 103 to a proper level.

A luminance/color signal generation unit 105 converts the signal generated by the image sensor 103 into a luminance signal (Y) and color signals (R, G, and B). A white balance amplifying unit 106 amplifies the color signals (R, G, and B) output from the luminance/color signal generation unit 105 according to a white balance gain and generates amplified color signals (R', G', and B'). A color-difference signal generation unit 107 generates color-difference signals (R'-Y, B'-Y). A color-difference signal correction unit 108 performs a correction such that a gain is made in the color-difference signals. An encoder 109 converts the color-difference signals into standard television signals or the like.

A signal dividing unit 110 divides the luminance signal (Y) and the color-difference signals (R'-Y and B'-Y) into predetermined small blocks, respectively. A hue/chroma calculation unit 111 calculates a hue signal/chroma signal (Hue, Chroma) from the color-difference signals (R'-Y and B'-Y). A hue histogram generation unit 112 generates a hue histogram from the hue signal/chroma signal. A camera control unit 113 controls an imaging system in its entirety. The camera control unit 113 sends an instruction to each unit in the imaging apparatus in order to cause the units to perform the respective processing. A scene discrimination unit 114 discriminates the scene of the input image. A scene discrimination control unit 115 controls scene discrimination processing performed by the scene discrimination unit 114.

A shooting operation of the imaging apparatus of FIG. 1 is described below. An object image which has passed through the lens 101 and iris 102 is formed on the image sensor 103. Light entering into the image sensor 103 is photoelectrically converted and amplified to a proper level by the AGC amplifier 104. Thereafter, the thus converted and amplified light is output to the luminance/color signal generation unit 105. In the luminance/color signal generation unit 105, the luminance signal (Y) and the color signals (R, G, and B) are generated, and, among those, the color signals (R, G, and B) are output to the white balance amplifying unit 106 and the luminance signal (Y) is output to the encoder 109, respectively.

In the white balance amplifying unit 106, the color signals (R, G, and B) are amplified based on the white balance gain calculated by the camera control unit 113. Thus amplified color signals (R', G', and B') are output to the color-difference signal generation unit 107. In the color-difference signal generation unit 107, the color-difference signals (R'-Y and B'-Y) are generated from the color signals (R', G', and B') and are output to the color-difference signal correction unit 108 or the signal dividing unit 110. In the color-difference signal correction unit 108, a gain (a degree of a gain is described below) calculated by the camera control unit 113 is made in the color-difference signals (R'-Y and B'-Y) in order to correct the color-difference signals (R'-Y and B'-Y). The corrected color-difference signals (R'-Y and B'-Y) are output to the encoder 109. In the encoder 109, a standard television signal such as NTSC is generated from the luminance signal (Y) to be output to the recording unit (not shown).

As one of characteristics of the present invention, image processing to be performed on image data, according to a captured scene, is described below. In the present exemplary embodiment, it is discriminated whether a captured scene of this image data is a vivid color scene based on the image data captured through an image pickup system. Subsequently, the image processing is performed on the image data according to the discrimination result. At the time, an attention is paid to a point that a feeling of the vividness differs depending on a difference of the color distribution in the vivid color scene, and therefore, different scene discrimination processing is to be performed according to a distribution of colors of thus obtained image data.

Figure 2A:
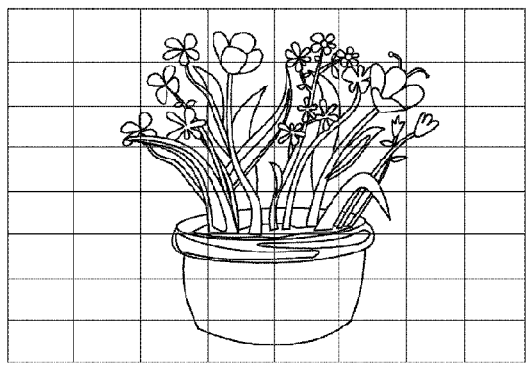
FIGS. 2A and 2B, respectively, illustrate a block division of an image signal.
Figure 2B:
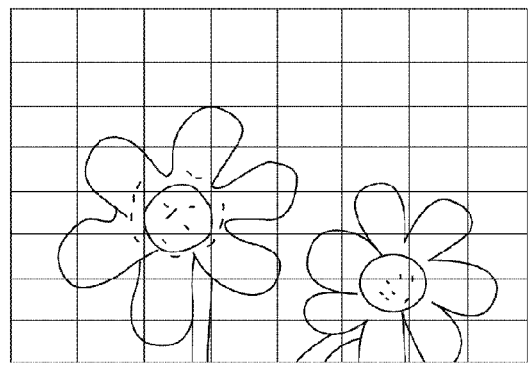

FIGS. 2A and 2B illustrate captured images of flowers wherein distribution states of colors are different between FIGS. 2A and 2B. FIG. 2A illustrates a case where various colors of flowers are captured and thus a lot of colors are present in the image. On the other hand, FIG. 2B illustrates a case where flowers having a specific color are captured, and thus the less number of colors are present in the image. In this case, a perception of human vision is that the image of FIG. 2A including a lot of colors is more vivid than the image of FIG. 2B including less colors although the chroma is identical to each other. In order to introduce the characteristic of this perception of human vision, in the present exemplary embodiment, the captured scene of the image data is classified according to whether the captured scene of the image data corresponds to a vivid color scene of simple color or colorful color. Then, whether the classified image data is a vivid color scene is determined by using a discrimination method according to the classification result. Hereinafter, the scene including a lot of colors in the image as illustrated in FIG. 2A is referred to as a colorful vivid color scene, whereas the scene including less color in the image as illustrated in FIG. 2B is referred to as a simple color vivid color scene.

The image data discriminated as the colorful vivid color scene or a simple color vivid color scene according to the scene discrimination processing performed by the scene discrimination unit 114 is subjected to vividness correction processing in which the chroma is raised by the color-difference signal correction unit 108 in order to highlight the vividness. Accordingly, the object which the user (i.e., the human) views to be vivid can be shown more vivid.

Figure 3:
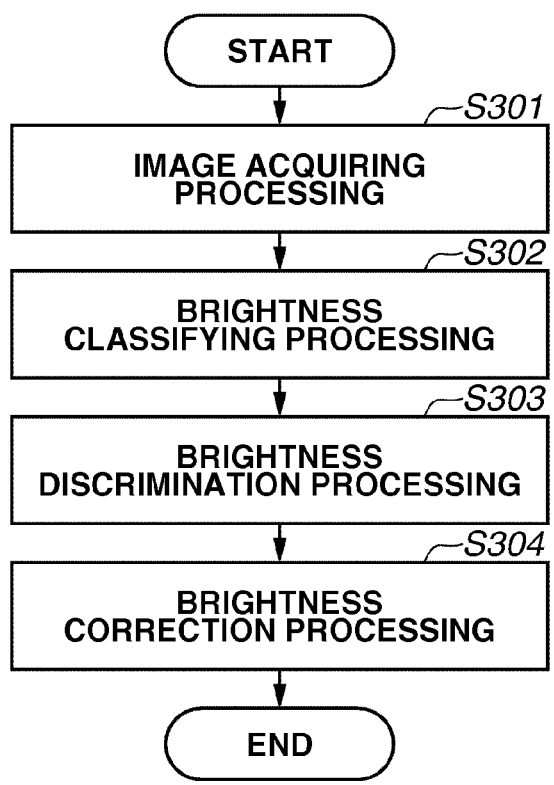
FIG. 3 illustrates a flow chart as to a series of processing as the characteristics of the present exemplary embodiment.

FIG. 3 illustrates a flow chart as to a series of processing as the characteristics of the present exemplary embodiment. The processing is performed by each unit according to an instruction of the camera control unit 113.

In step S301, image data is acquired from the color-difference signal generation unit 107 and is divided into a plurality of blocks at a signal dividing unit 110. In step S302, based on information such as a chroma or a hue per every block, thus acquired image data is subjected to vividness classification processing that classifies whether thus acquired image data may be a simple color vivid color scene or may be a colorful vivid color scene. In step S303, the scene discrimination unit 114 determines whether the image data is the vivid color scene according to the discrimination condition of the classification result, and the discrimination result is output. In step S304, based on the discrimination result obtained in step S303, the correction processing is performed with respect to the image data and then the processing is ended.

In the present exemplary embodiment, the image data used in the scene discrimination result is output after the discrimination result is reflected in the image data; however, the present invention is not limited thereto. In other words, correction processing according to the discrimination result with respect to a certain frame (i.e., image data) can be reflected in the next frame and the following frames. The scene is firstly specified after a plurality of frames results in a vivid color scene, or the scene is specified in a case where a percentage that the image data is discriminated as the vivid color scene is high among the plurality of frames. Namely, the scene can be specified based on the plurality of frame discrimination results. At the time, the correction processing according to the discrimination result can be reflected in the plurality of frames and the following frames.

Specifically, there may be a case where the processing is performed on the captured image data (i.e., the frame) in an information processing apparatus such as an imaging apparatus capable of capturing still images and a personal computer (PC) that performs image processing on the image data. Further, in the information processing apparatus such as the imaging apparatus capable of displaying a live view and capturing a moving image and the PC that performs image processing on the moving image, the above described processing performed throughout the plurality of frames is conceivable.

In the present exemplary embodiment, the chroma is corrected with respect to the image data by using the discrimination result output by the scene discrimination unit 114; however, a method for using the discrimination result is not limited thereto. For example, it is possible to cause the display unit (not shown) to display the discrimination result and thereby cause the user to know the discrimination result. Alternatively, when the image data is stored, it is possible to specify the captured scene of the image data, after the image data is stored, by attaching information corresponding to the discrimination result to a header or the like of the captured scene. Correction processing may be performed by highlighting the vividness by correction other than the chroma. Examples of such processing include correction processing in which a degree of luminance is raised or a contour is highlighted.

The above described series of processing is described below in detail. In step S301, the color-difference signal output from the color-difference signal generation unit 107 is taken into the signal dividing unit 110. Thus taken image in its entirety is divided into blocks (8×8) as illustrated in FIGS. 2A and 2B. An average value of the color-difference signals (R'-Y and B'-Y) per one block is calculated and output to the hue/chroma calculation unit 111.

Figure 4A:
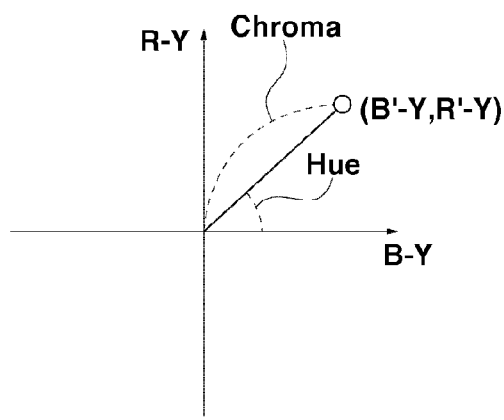
FIG. 4A illustrates a relationship between a color-difference signal and a chroma/hue.

In step S302, the following vividness classification processing is performed. In step S302, the hue/chroma calculation unit 111 calculates a hue (Hue) and a chroma (Chroma) per each block from the color-difference signals (R'-Y and B'-Y) per each block. A relationship between the color-difference signal and the hue and the chroma is illustrated in FIG. 4A. The following formula is used in order to calculate the hue and the chroma from the color-difference signal.

$$\text{色相 (Hue)} = \arctan((R'-Y)/(B'-Y))$$

$$\text{彩度 (chroma)} = \sqrt{(R'-Y)^2 + (B'-Y)^2} \qquad 1$$

The hue/chroma calculation unit 111 outputs thus calculated hue (Hue) and chroma (Chroma) per each block to the hue histogram generation unit 112.

In the hue histogram generation unit 112, a hue histogram is generated from the hue (Hue) and the chroma (Chroma) per each block.

Figure 4B:
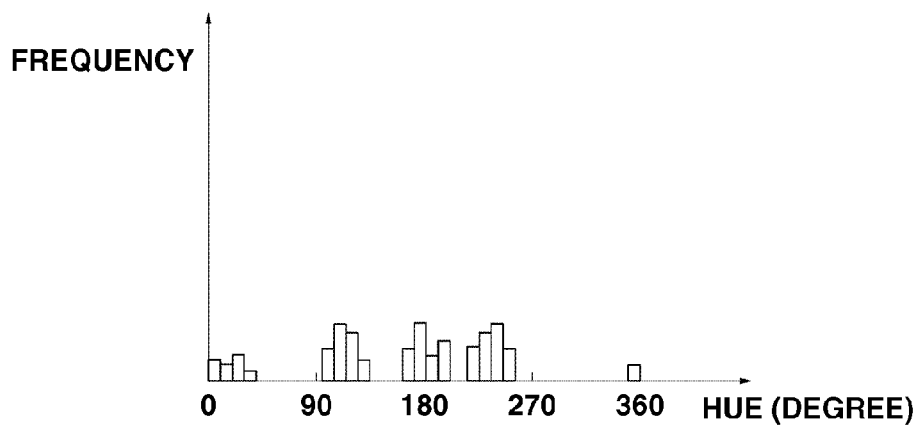
FIGS. 4B and 4C, respectively, illustrate all example of a hue histogram according to the first exemplary embodiment.
Figure 4C:
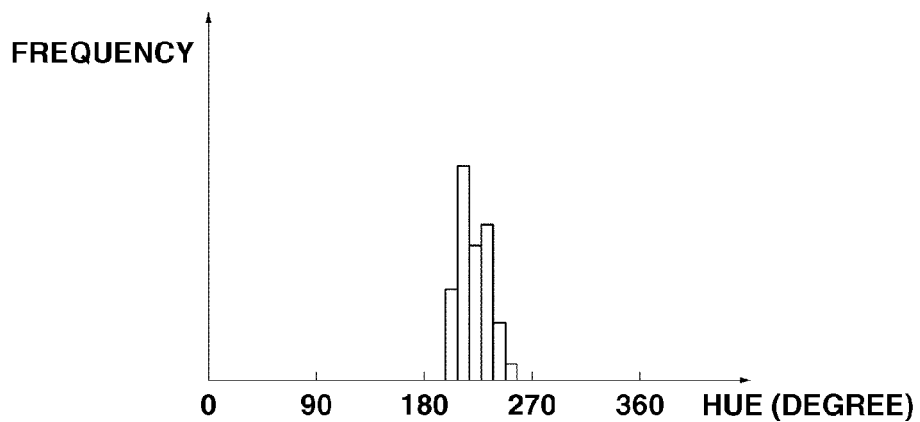

The hue histogram generation unit 112 compares the chroma (Chroma) of each block with a predetermined threshold (i.e., a third chroma threshold). Then, in a case where the chroma of the block is equal to or greater than a predetermined value, a frequency is added to the hue corresponding to the block. In a case where the chroma of the block is lower than the threshold, the block is not included in the hue histogram. In the present exemplary embodiment, the hue histograms generated with respect to the images of FIGS. 2A and 2B are illustrated in FIGS. 4B and 4C, respectively. In each of FIGS. 4B and 4C, a horizontal axis (i.e., a class) represents the hue (Hue) and a width of the class is 10 (degrees) here. A vertical axis represents a frequency and thus represents the number of blocks having each hue.

Then, the hue histogram generation unit 112 calculates an index representing a spreading degree of the color distribution. Here, the number of classes (i.e., the number of hues), where the frequency in the hue histogram is not zero, is used as the index. In the cases of FIGS. 4B and 4C, the numbers of hues are 17 and 6, respectively. The hue histogram generation unit 112 outputs thus calculated number of hues to the discrimination control unit 115.

The scene discrimination control unit 115 controls the scene discrimination processing performed by the scene discrimination unit 114 based on the number of hues calculated by the hue histogram generation unit 112. More specifically, the scene discrimination control unit 115 calculates a discrimination threshold used in the discrimination of the scene and outputs the discrimination threshold to the scene discrimination unit 114.

Figure 5:
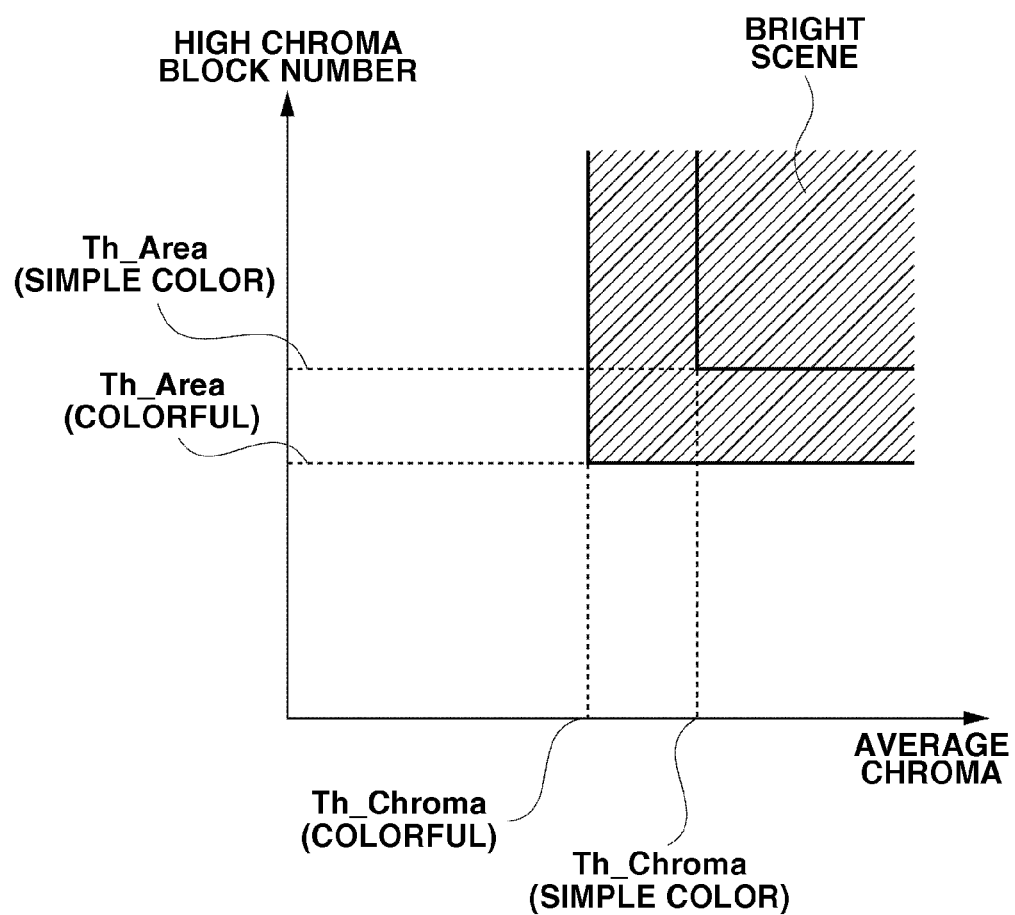
FIG. 5 illustrates characteristics of scene discrimination processing performed by a scene discrimination unit.

The discrimination threshold calculated by the scene discrimination control unit 115 is described below with reference to FIG. 5. A case where the scene is discriminated based on an average chroma of an image and the number of high chroma blocks within the image is exemplified here. FIG. 5 illustrates a discrimination reference of the vivid color scene. A horizontal axis of FIG. 5 represents the average chroma and a vertical axis represents the number of high chroma blocks. An area of FIG. 5 indicated by a hatched line, i.e., an area where the average chroma is higher than a threshold (Th_Chroma) and the number of blocks having the chroma equal to or greater than the threshold is larger than the threshold (Th_Area), is determined as the vivid color scene.

The discrimination thresholds Th_Area (colorful) and Th_Chroma (colorful) used with respect to the "colorful" scene are set to a value lower than the discrimination thresholds Th_Area (simple color) and Th_Chroma (simple color) used with respect to the "simple color" scene. In other words, Th_Area (colorful)<Th_Area (simple color) and Th_Chroma (colorful)<Th_Chroma (simple color) are established.

The scene discrimination control unit 115 discriminates whether the present scene may be the colorful vivid color scene or the simple color vivid color scene by comparing the number of hues with the predetermined threshold. According to the result thereof, the scene discrimination threshold is determined. More specifically, in a case where the number of hues is equal to or greater than the threshold, values of Th_Area (colorful) (i.e., a first block threshold) and Th_Chroma (colorful) (i.e., a first chroma threshold) are output to the scene discrimination unit 114. To the contrary, in a case where the number of hues is smaller than the predetermined value, values of Th_Area (simple color) (i.e., a second block threshold) and Th_Chroma (simple color) (i.e., a second chroma threshold) are output to the scene discrimination unit 114. The threshold with respect to the number of hues is set to, for example, 8.

Now, vivid discrimination processing of step S303 is described below. In step S303, the scene discrimination unit 114 discriminates a scene based on the chroma data of each block calculated by the hue/chroma calculation unit 111 and the discrimination threshold calculated by the scene discrimination control unit 115. A processing content of the scene discrimination performed by the scene discrimination unit 114 is illustrated by a flow chart of FIG. 6.

Figure 6:
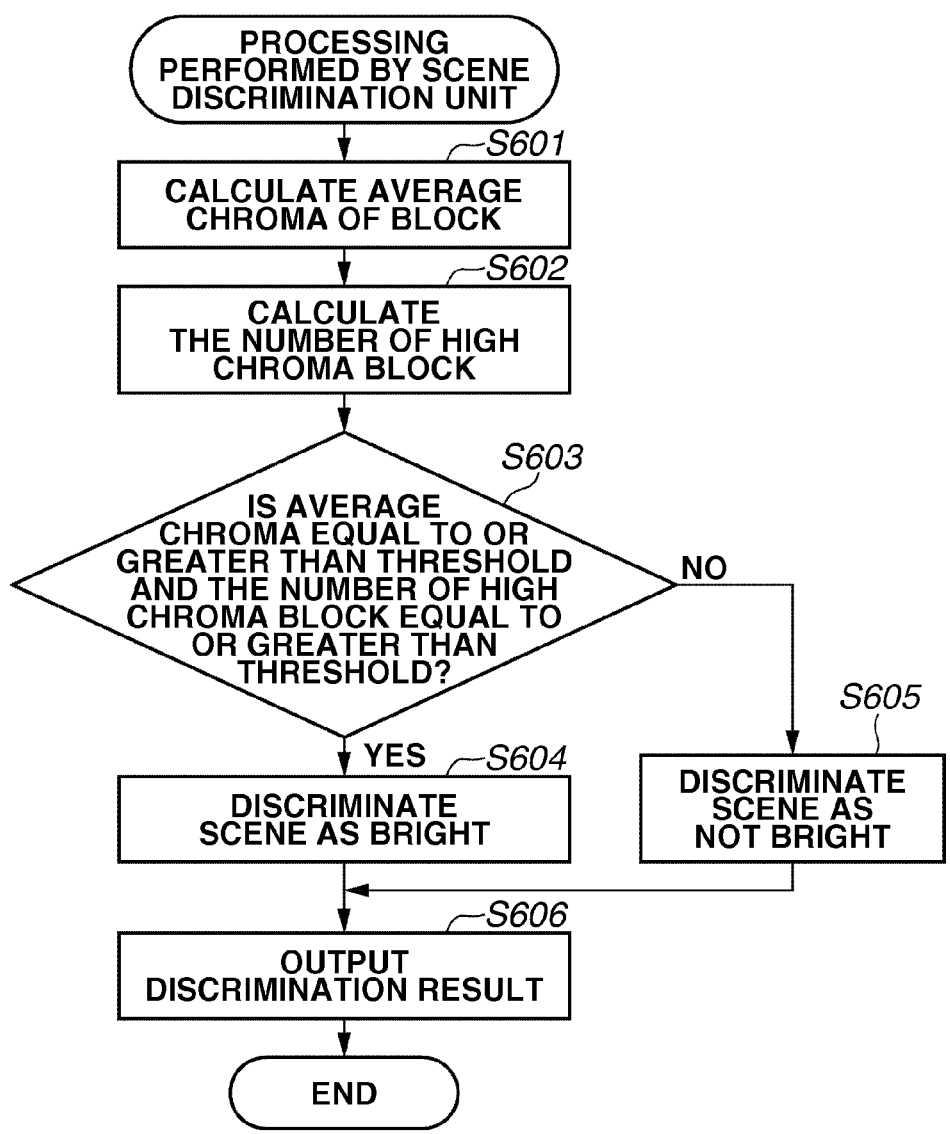
FIG. 6 is a flow chart illustrating processing performed by the scene discrimination unit according to the first exemplary embodiment.

In step S601 of FIG. 6, the chroma per each block calculated by the hue/chroma calculation unit 111 is averaged with respect to all the blocks of the image to calculate an average chroma. In step S602, the number of blocks having the chroma equal to or greater than the predetermined value (i.e., high chroma blocks) is counted among all the blocks of the image. In step S603, thus calculated value is compared with the discrimination threshold according to the number of hues output from the scene discrimination control unit 115. In other words, in a case where the average chroma is equal to or greater than the predetermined value (Th_Chroma) and the number of high chroma blocks is equal to or greater than the predetermined number (Th_Area) (YES in step S603), in step S604, the present scene is discriminated as the vivid color scene. Incases other than the above (NO in step S603), the present scene is not determined as the vivid color scene.

In step S606, the scene discrimination unit 114 outputs information of the scene discrimination result to the camera control unit 113.

Lastly, vividness correction processing performed in step S304 is described below. The camera control unit 113 controls a parameter of the color-difference signal correction unit 108 based on the information of the scene discrimination result at the scene discrimination unit 114. In the present exemplary embodiment, the above described chroma gain G of the color-difference signal correction unit 108 is controlled. Examples of the chroma gain G include parameters of G1 and G2. The parameters of G1 and G2 have a relationship of G1>G2 (provided that G1 and G2, respectively, are equal to or greater than 1). In a case where the scene discrimination unit 114 determines that the scene is the vivid color scene, G1 is set to the chroma gain, whereas, in a case where the scene discrimination unit 114 determines that the scene is not the vivid color scene, G2 is set to the chroma gain. More specifically, in a case where the scene is the vivid color scene, the image is corrected such that the gain with respect to the color-difference signal is raised to obtain an image highlighting chroma.

As described above, the image processing apparatus of the present invention configured to discriminate whether the image is the vivid color scene and control the image processing according to the discrimination result is characterized in that the scene discrimination is controlled according to the spreading of the color distribution. More specifically, in a case of more number of hues, the threshold for discriminating a vivid color scene is set to a lower value in comparison with a case of less number of hues. Accordingly, even in a case where the chroma of each of the colors included in the image is the same, the image tends to be discriminated as the vivid color scene in the case of more number of hues than the case of less number of hues. Therefore, the discrimination of the vivid color scene that matches more the perception of a human can be carried out.

In the above described exemplary embodiment, the hue and the chroma are calculated from the color-difference signal; however, the calculation method of the hue and the chroma of the present invention is not limited thereto. For example, the hue and the chroma can be calculated such that the hue and the chroma are once converted into the other space such as a L*a*b* space and thereafter the hue and the chroma in the L*a*b* space are calculated.

In the above described exemplary embodiment, such an example is described that the signal dividing unit 110 divides the image signal into 8×8 blocks. However, the image signal can be divided into any number of blocks as far as the discrimination of the vivid color scene is controlled according to the color distribution in the image. The signal dividing unit 110 may have such a configuration that the spreading of the color distribution is discriminated from hue/chroma information per pixel unit.

In the exemplary embodiment, such a case is described that the number of classes in which the frequency of the hue histogram is not zero (i.e., the number of hues) is used as the index indicating a degree of the spreading of the color distribution in the image. However, any method can be used as long as the degree of the spreading of the color distribution in the image is detected. For example, a percentage of the frequency around a peak of the hue histogram with respect to the entirety may be used as the index. A width of the peak of the hue histogram may be used as the index. Further, by calculating a variance value of the respective values existing in the area of equal to or greater than the chroma threshold in a color-difference plain in FIG. 4A, the degree of the spreading of the color distribution can be calculated. Various methods for detecting the degree of the spreading of the color distribution from the hue distribution can be applied to the present invention.

In the present exemplary embodiment, the discrimination whether the image is the vivid color scene is performed based on two pieces of information such as the average chroma value and the number of high chroma blocks. However, the method for discriminating the vivid color scene is not limited thereto. For example, the discrimination of the vivid color scene may be performed based on the chroma information in the area where the chroma is the highest in the image.

In the above described exemplary embodiment, the discrimination threshold is set for each of the case where the number of hues is equal to or greater than the threshold and the case where the number of hues is less than the threshold. However, a way of setting the discrimination threshold is not limited thereto in the present invention. For example, such a method is also used that a series of values are calculated and set such that as the number of hues becomes larger, the discrimination threshold becomes lower. Alternatively, only the average chroma threshold or only the threshold of the number of high chroma blocks may be changed.

In the above described exemplary embodiment, a case where the gain multiplying the color-difference signal is controlled based on the discrimination result discriminating whether the image is the vivid color scene is described. However, any control method may be employed as long as the control is performed such that the color signal or the luminance signal is corrected based on whether the image is the vivid color scene.

Also, in the above described exemplary embodiment, the discrimination was performed between two values, i.e., according to whether the image is the vivid color scene. However, the discrimination may be performed between multiple values, i.e., according to the degrees of the vividness. In this case, as the average chroma becomes higher and as the number of blocks of which chroma is equal to or greater than the threshold becomes larger, the degree of the vividness becomes higher. Alternatively, the greater the number of hues, the higher the degree of vividness. Then, based on the degree of the calculated vividness, the signal of the color-difference signal correction unit 108 is corrected (i.e., As the degree of the vividness becomes higher, the gain multiplying the color-difference signal is set to be higher).

In the present exemplary embodiment, such processing is described that the chroma is raised with respect to the image data that is discriminated as the vivid color scene and the brightness of the image data is highlighted. However, the processing is not limited thereto, but the present exemplary embodiment may be applied to such processing that the chroma is lowered with respect to the vivid color scene to suppress the vividness of the scene. In this case, the gain may be set to, for example, G1<G2≤1.

In the first exemplary embodiment, a case that the discrimination threshold of the scene is controlled according to the spreading of the color distribution is described.

Ina second exemplary embodiment, processing that the chroma is corrected according to the spreading of the color distribution and the discrimination whether the image is the vivid color scene is made based on thus corrected chroma information.

Figure 7:
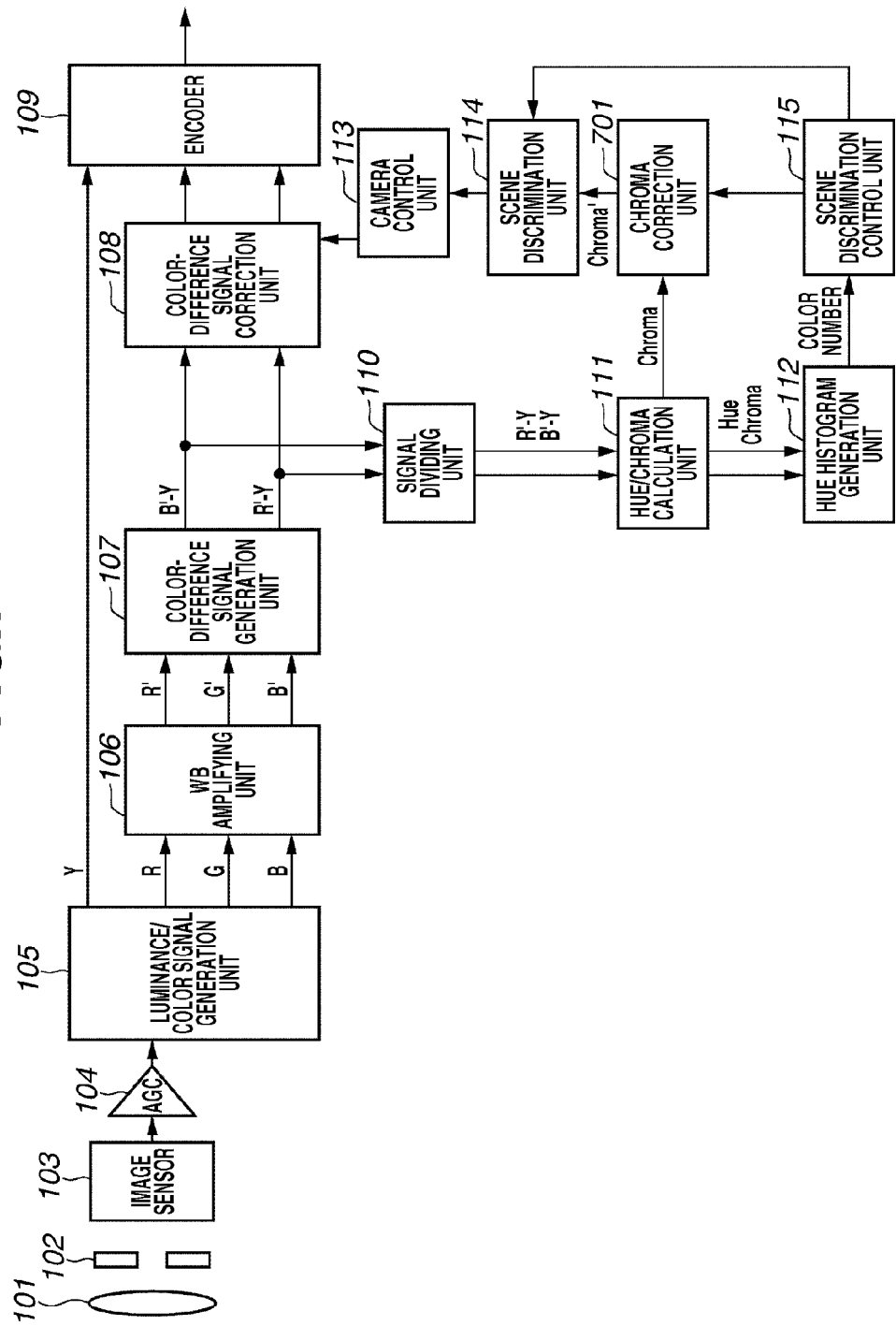
FIG. 7 is a block diagram illustrating a configuration of an imaging apparatus according to a second exemplary embodiment.

FIG. 7 illustrates a main configuration of an imaging apparatus according to the present exemplary embodiment. The same numbers and/or symbols are attached to structural components similar to those of FIG. 1 and the detailed descriptions thereof are omitted here. In the present exemplary embodiment, a chroma correction unit 701 is newly added. In the chroma correction unit 701, a following chroma gain (G_Chroma) is multiplied by the chroma (Chroma) calculated by the hue/chroma calculation unit 111, to calculate the chroma (Chroma') after the correction.

Figure 8:
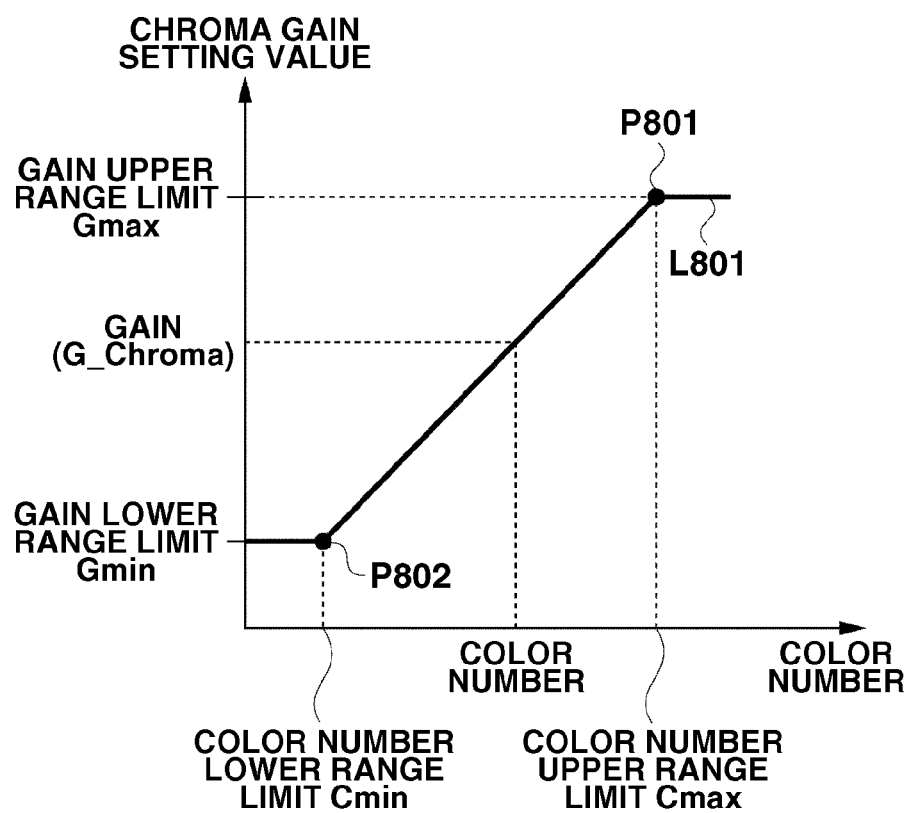
FIG. 8 is a graph illustrating characteristics of chroma correction processing according to the second exemplary embodiment.

The scene discrimination control unit 115 calculates the chroma gain (G_Chroma) (i.e., a correction amount) based on the number of hues calculated by the hue histogram generation unit 112. In FIG. 8, a vertical axis indicates the chroma gain and a horizontal axis indicates the number of hues. A chroma gain setting value P801 in FIG. 8 represents an upper limit of a predetermined number of hues and the chroma gain setting value at the upper limit. Similarly, the gain setting value P802 represents a lower limit value of a predetermined number of hues and the chroma gain setting value at the lower limit. L801 represents a relationship between the number of hues and the chroma gains determined by P801 and P802, respectively. In a case where the number of hues is large (i.e., a first state), L801 is set to a small gain (i.e., a first correction amount), whereas in a case where the number of hues is small (i.e., a second state), L801 is set to a large gain (i.e., a second correction amount). As it is illustrated in FIG. 8, the more the number of hues, the larger the values of the chroma gain. The scene discrimination control unit 115 determines the chroma gain (G_Chroma) (i.e., the correction amount) based on a characteristic represented by L801 and the input number of hues. Then, the scene discrimination control unit 115 outputs thus calculated chroma gain to a chroma correction unit 701.

The scene discrimination control unit 115 outputs a threshold used in discriminating a predetermined scene, i.e., the average chroma threshold (Th_Chroma) and the high chroma block number threshold (Th_Area), to the scene discrimination unit 114.

The chroma correction unit 701 multiplies by the chroma gain (G_Chroma) (i.e., the correction amount) the chroma (Chroma) per each block output from the hue/chroma calculation unit 111 in order to calculate a chroma after correction (Chroma'). Thus calculated chroma (Chroma') is output to the scene discrimination unit 114. This correction processing is repeatedly performed with respect to all of the 8×8 blocks illustrated in FIG. 2.

Subsequently, the scene discrimination unit 114 performs the discrimination processing of the scene based on the input chroma after the correction (Chroma'). In the discrimination processing, different from the first exemplary embodiment, common thresholds (Th_Chroma and Th_Area) are used independent from the number of hues of the image data. Contents of the discrimination processing and the following correction processing performed by the camera control unit 113 are similar to those performed in the first exemplary embodiment, so that detailed descriptions thereof are omitted here.

As described above, the present invention is directed to an image processing apparatus wherein whether the image is the vivid color scene is discriminated and the image processing is controlled according to the discrimination result, characterized in that the discrimination of the scene is controlled according to the degree of the spreading of the color distribution. More specifically, in the image processing apparatus of the present invention, the chroma gain is calculated according to the number of hues and the discrimination whether the image is the vivid color scene is made based on the chroma data after the chroma gain multiplies the chroma data.

Accordingly, even if the chroma of the respective colors included in the image is the same, the image tends to be discriminated as the vivid color scene in a case of more hues than in a case of less hues. Therefore, the discrimination of the vivid color scene that matches more the perception of the human can be made.

In the above described exemplary embodiment, the method for calculating the chroma gain is described according to a calculation method performed based on the predetermined setting value and the number of hues. However, the method for correcting the chroma in the present invention is not limited thereto. For example, such method may be employed that two different setting values are preliminarily set and either one of the setting values may be used as the chroma gain according to a result whether the number of hues is larger or smaller than a predetermined threshold. More specifically, any method can be used as long as the chroma is corrected more as the number of hues becomes larger.

In the second exemplary embodiment, a case is described where the correction processing with respect to the chroma is controlled according to the spreading of the color distribution.

In a third exemplary embodiment, a case is described where the discrimination whether the image is the vivid color scene is made based on the spreading of the color distribution and the chroma information.

A configuration of an imaging apparatus according to the present exemplary embodiment is similar to that of the first exemplary embodiment illustrated in FIG. 1, so that a detailed description thereof is omitted here.

Figure 9A:
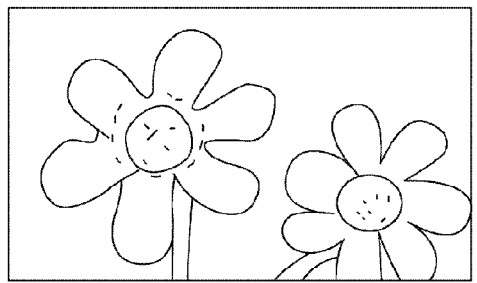
FIGS. 9A and 9B, respectively, illustrate an example of a capturing scene according to a third exemplary embodiment.
Figure 9B:
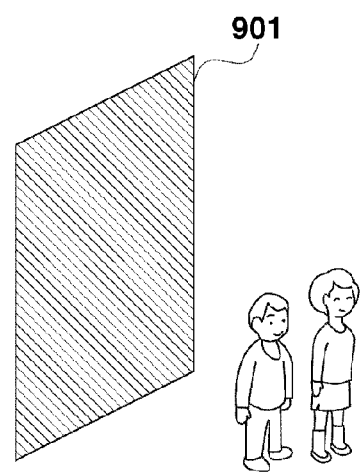

A case that the discrimination of the scene is made as to images as illustrated in FIGS. 9A and 9B is exemplified and described. FIG. 9A illustrates a case where a flower having a high chroma that is discriminated as the vivid color scene of the simple color is captured. On the other hand, in FIG. 9B, a wall 901 is positioned as a background of objective persons. The wall 901 has a high chroma and a uniform color. In this case, even where the flower of the image of FIG. 9A has the same chroma as the background portion of the image of FIG. 9B, there is a case where the user does not intend to capture a vivid image in a condition of FIG. 9B. As described above, even in a case of the vivid color scene of the simple color, such processing can be performed in the present exemplary embodiment that the user's intention that the user does not desire to capture the background portion of FIG. 9B as the vivid color scene can be picked up.

Figure 10A:
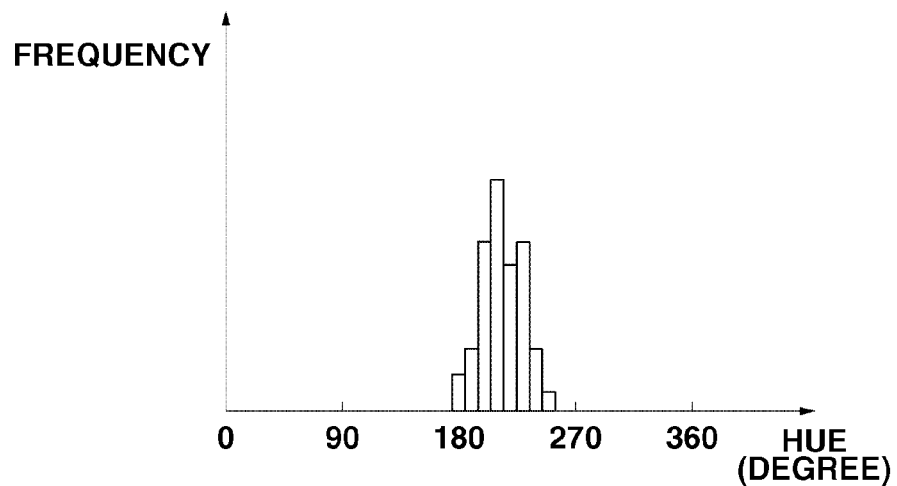
FIGS. 10A and 10B, respectively, illustrate an example of a hue histogram according to the third exemplary embodiment.
Figure 10B:
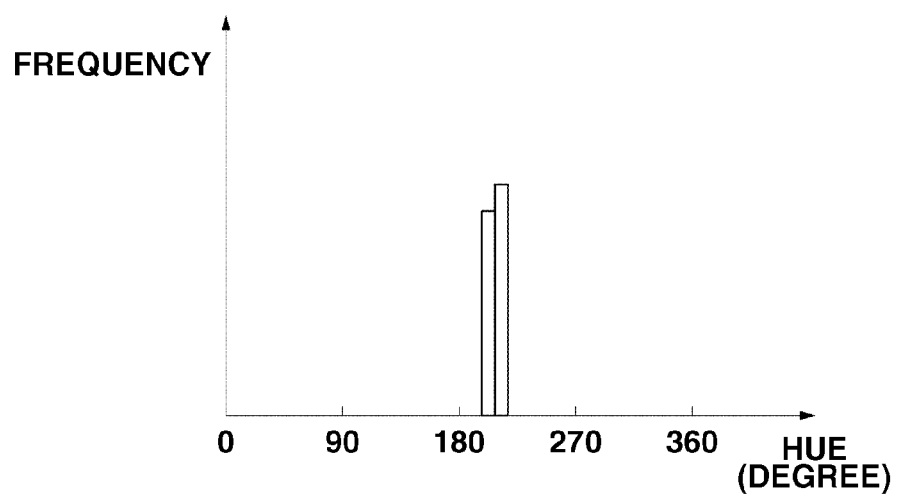

The hue histograms generated according to the similar methods as the first and the second exemplary embodiments with respect to the images of FIGS. 9A and 9B are illustrated in FIGS. 10A and 10B, respectively. It is known from the image of FIG. 9A, which is an image of the flower having a vivid simple color, that the image of the flower is somewhat spreadingly distributed around the hue of a certain frequency. To the contrary, in the image of FIG. 9B, only the background portion is included in the hue histogram and is painted uniformly, so that the number of hues with respect to the image of FIG. 9B is less than that of the image of FIG. 9A. The numbers of hues with respect to the hue histograms of FIGS. 10A and 10B, respectively, is 8 and 2.

As described above, in the image that the user does not intend to capture the vivid image, the number of hues tends to be much less even in a case of the vivid color scene having the same simple colors. Accordingly, a step that the above described scene is not discriminated as the vivid color scene but is excluded is added to the present exemplary embodiment.

Figure 11:
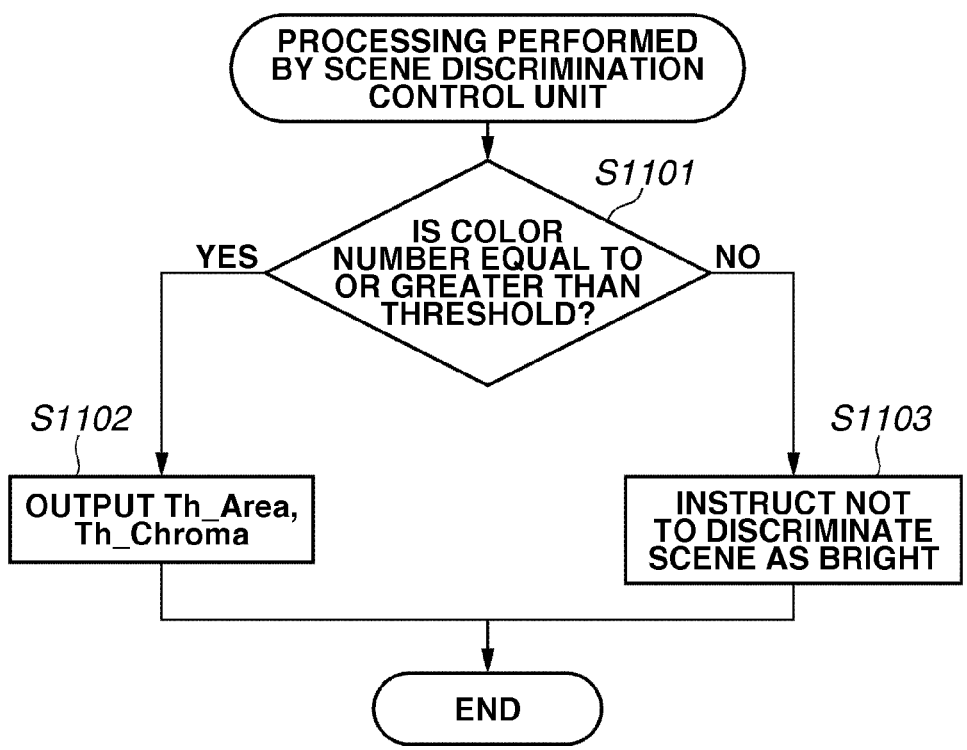
FIG. 11 is a flow chart illustrating processing of a scene discrimination control unit according to the third exemplary embodiment.

A processing content of the scene discrimination control unit 115 which performs the above described exclusion processing step is described below with reference to a flow chart of FIG. 11. In the present exemplary embodiment, the processing is performed as vividness classification processing of step S302 described in the first exemplary embodiment.

In step S1101, the scene discrimination control unit 115 compares the number of hues calculated by the hue histogram generation unit 112 with a predetermined threshold. In a case where the number of hues is equal to or greater than the predetermined threshold (YES in step S1101), the processing proceeds to step S1102. In a case where the number of hues is less than the predetermined threshold (NO in step S1101), the processing proceeds to step S1103. The threshold here is set to a value smaller than the threshold used in discriminating the colorful vivid color scene from the simple color vivid color scene which is described with reference to FIG. 5 in the first exemplary embodiment. A case where the threshold is set to 3 is described here.

In step S1102, in a similar manner as that of the first exemplary embodiment, the number of hues is compared with the predetermined threshold to discriminate whether the present scene may be the colorful vivid color scene or the present scene may be the simple color vivid color scene. According to the result thereof, the threshold for discriminating the scene is determined. More specifically, in a case where the number of hues is equal to or greater than the threshold, the values of Th_Area (colorful) and Th_Chroma (colorful) are output to the scene discrimination unit 114. To the contrary, in a case where the number of hues is less than the threshold, the values of Th_Area (simple color) and the Th_Chroma (simple color) are output to the scene discrimination unit 114. The scene discrimination unit 114 followed by the scene discrimination control unit 115 instructs the scene discrimination unit 114 to perform the discrimination of the scene.

In step S1103, the scene discrimination control unit 115 instructs the scene discrimination unit 114 not to discriminate the present scene as the vivid image.

Figure 12:
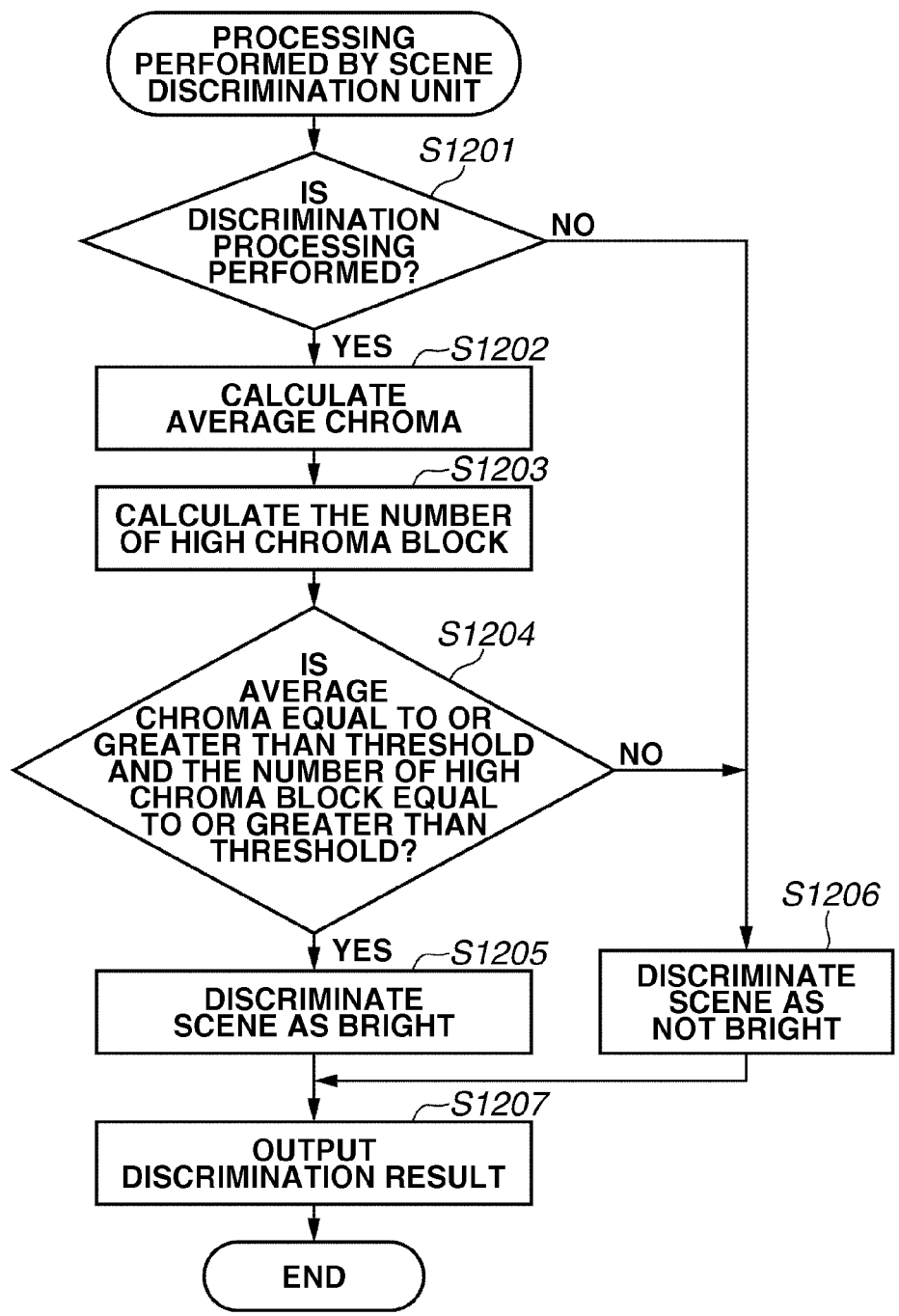
FIG. 12 is a flow chart illustrating processing of the scene discrimination unit according to the third exemplary embodiment.

The scene discrimination processing performed by the scene discrimination unit 114 is described below with reference to a flow chart of FIG. 12.

In step S1201, the scene discrimination unit 114 determines whether the discrimination of the scene is to be performed. More specifically, in a case where the scene discrimination control unit 115 issues an instruction to perform the scene discrimination processing (YES in step S1201), the processing proceeds to step S1202 where the scene discrimination processing is performed. In a case where the scene discrimination control unit 115 issues an instruction not to perform the scene discrimination processing (NO in step S1201), the processing proceeds to step S1206.

Therefore, in a case where the image illustrated in FIG. 9A is input, the discrimination whether the image is the vivid color scene is made based on the predetermined discrimination threshold after step S1202. On the other hand, in a case where the image illustrated in FIG. 9B is input, the processing proceeds to step S1206 where the present scene is not discriminated as the vivid color scene.

The scene discrimination processing performed in steps S1202 through 1204 is similar to that performed in steps S601 through S603 of FIG. 6 in the first exemplary embodiment, so that a detailed description thereof is omitted here. In a case where a discrimination condition in step S1204 is satisfied (YES in step S1204), the processing proceeds to step S1205 where the scene discrimination unit 114 determines that the present scene is the vivid image. In a case where the discrimination condition is not satisfied (NO in step S1204), the processing proceeds to step S1206 where the scene discrimination unit 114 determines that the present scene is not the vivid image.

In step S1207, the scene discrimination unit 114 outputs information of the scene discrimination result to the camera control unit 113. A processing content performed by the scene discrimination unit 114 is described above.

The camera control unit 113 controls the parameter of the color-difference signal correction unit 108 based on the information of the scene discrimination result determines by the scene discrimination unit 114. In the present exemplary embodiment, scene discrimination unit 114 controls the chroma gain G of the above described color-difference signal correction unit 108. The parameters G1 and G2 as the chroma gain G have a relationship of G1>G2 (provided that G1 and G2 are equal to or greater than 1). In a case where the scene discrimination unit 114 determines that the scene is the vivid image, G1 is set as the chroma gain, whereas, in a case where the scene discrimination unit 114 determines that the scene is not the vivid image, G2 is set as the chroma gain. More specifically, in the vivid color scene, since the gain with respect to the color-difference signal is set higher, the scene is corrected to an image highlighting the chroma.

As described above, the image processing apparatus of the present invention, wherein the discrimination is made whether the scene is the vivid color scene in order to control the image processing according to the discrimination result, is characterized in that the scene discrimination is controlled according to the spreading of the color distribution. More specifically, in a case where the number of hues is less than the predetermined threshold, the scene is controlled not to be discriminated as the vivid color scene.

Accordingly, in a case where the wall painted uniformly with a chromatic color is used as the background upon capturing an image, it becomes possible to discriminate the scene which has a high chroma but the user does not intend to capture as a vivid object. Namely, it becomes possible to discriminate the vivid color scene that matches more the perception of the human.

Preferred exemplary embodiments of the present invention are described above; however, the present invention is not limited to these exemplary embodiments. Various changes and modifications may be provided to the present invention without departing from the scope of the invention.

In the above described exemplary embodiment, a control is performed to determine whether the scene is the vivid image based on the spreading of the hue and the chroma information; however, the present invention is not limited to this method for controlling the scene discrimination. There are a lot of cases that the user does not intend to capture the object as the vivid image with respect to the scene having low chroma or low degree in the spreading of the luminance distribution. In the hue histogram generation unit 112, the hue histogram is generated together with the chroma distribution or the luminance distribution. In a case where the spreading of the distributions is narrower than a predetermined threshold, the scene is not discriminated as the vivid image, so that a control can be performed to reflect the user's intention.

In the third exemplary embodiment, a case where the information of the spreading of the color distribution is used in discriminating the vivid color scene. More specifically, in a case where the number of hues in the image is less than the predetermined threshold, a control is performed not to discriminate the image as the vivid color scene.

In a fourth exemplary embodiment, a case where a control is performed to discriminate a vivid color scene according to the color distribution in a specific area in the image is described.

Figure 13:
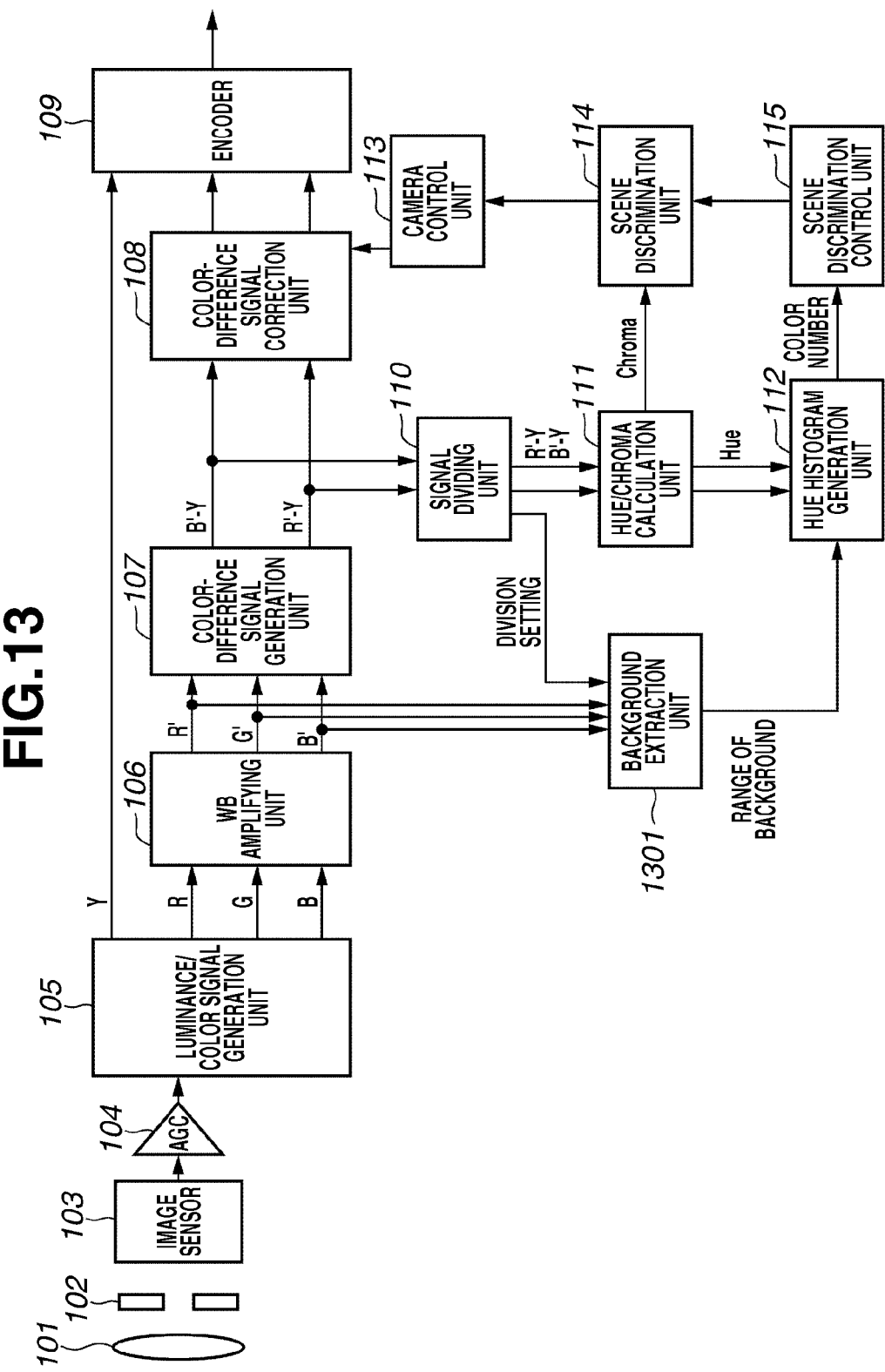
FIG. 13 is a block diagram illustrating a configuration of an imaging apparatus according to a fourth exemplary embodiment.

FIG. 13 illustrates a main configuration of an imaging apparatus according to the present exemplary embodiment. Components similar to the components illustrated in FIG. 1 are provided with the same numbers and/or symbols and detailed descriptions thereof are omitted here. In the present exemplary embodiment, a background extraction unit 1301 is newly provided in addition to the components of FIG. 1.

The background extraction unit 1301 extracts a background area in the image and outputs information of a position or a range of the background area to the hue histogram generation unit 112.

A processing operation of an imaging apparatus according to the fourth exemplary embodiment is described below.

A series of processing from the entrance of the object image into the lens 101 to the calculation of the hue/chroma per each block in the hue/chroma calculation unit 111 is similar to that performed in the first exemplary embodiment, so that the detailed description thereof is omitted here.

The present exemplary embodiment differs from the above described exemplary embodiments in that the hue histogram generation unit 112 generates the hue histogram by using only the background portion of the image.

Figure 14:
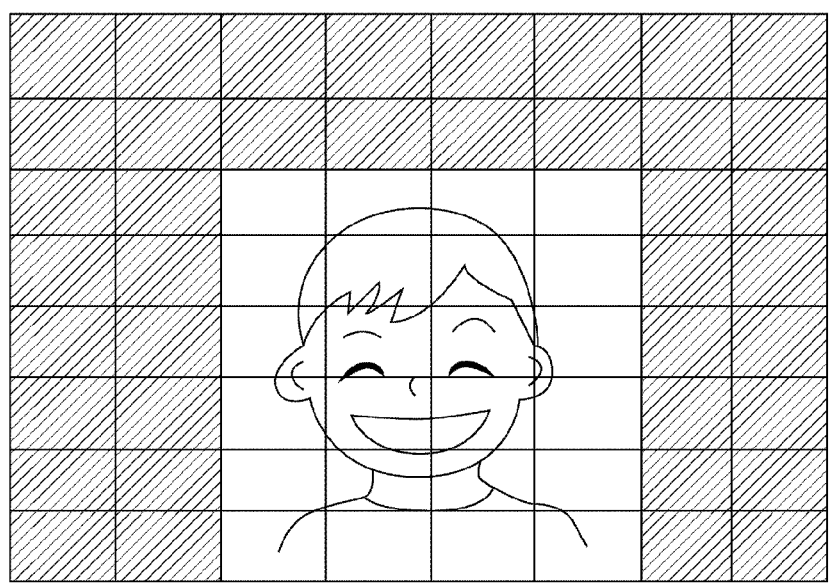
FIG. 14 illustrates an image division according to the fourth exemplary embodiment.

In order to perform the above processing, the background extraction unit 130 extracts the background portion in the image. More specifically, the background extraction unit 1301 detects a face of a person within the image and calculates a position and a size of the person by using a publicly known processing for recognizing a face. Based on this calculation result, the background extraction unit 1301 divides the image into the object area including the person in the image and the background area other than the object area. Then, the background extraction unit 1301 uses information of positions or sizes of the blocks of the image, after they are divided into 8×8 blocks set in the signal dividing unit 110, to extract the blocks overlapping with the background. FIG. 14 illustrates an example of an image wherein blocks corresponding to the background area is extracted according to the above described method. FIG. 14 illustrates the blocks extracted as the background area in the form of the hatched blocks. The background extraction unit 1301 outputs positions of these blocks as information of the background area to the hue histogram generation unit 112.

Now, a processing operation of the hue histogram generation unit 112 according to the present exemplary embodiment is described below. In a similar manner as the case of the first exemplary embodiment, the hue histogram generation unit 112 generates the hue histogram and thereafter calculates the number of hues, then the number of hues is output to the scene discrimination control unit 115. However, the hue histogram generation unit 112 generates the hue histogram by using only the blocks classified as the background area illustrated in FIG. 14.

The following processing, i.e., a control of the scene discrimination performed by the scene discrimination control unit 115, scene discrimination processing performed by the scene discrimination unit 114, and hue correction processing performed by the camera control unit 113 are similar to those performed in the third exemplary embodiment, so that detailed descriptions thereof are omitted here.

As described above, the image processing apparatus of the present invention, wherein whether the image is the vivid color scene is determined in order to control the image processing according to the discrimination result, is characterized in that the discrimination of the scene is controlled according to the spreading of the color distribution of the background area. More specifically, in a case where the number of hues included in the background area is less than the predetermined threshold, the control is performed not to discriminate the image as the vivid color scene.

Accordingly, in a case where an image is captured with the wall uniformly painted with the chromatic color as the background, it becomes possible to discriminate the scene which has a high chroma but the user does not intend to capture the object as the vivid color scene. Therefore, it becomes possible to discriminate the vivid color scene that matches more the perception or the intention of the human.

In the above described exemplary embodiment, a method for extracting the background area by using the publicly known face recognition technique is described; however, the present invention is not limited to this method for extracting the background. For example, the background may be extracted such that a position of a focus detection area that was a focused area at the time of capturing an image is acquired and the background is extracted based on the position of the focus detection area. In this case, since it is considered that the main object exists in the focus detection area and around the focus detection area, an image area where the focus detection area and the area around the focus detection area are removed from the image area may be extracted as the background.

In the present exemplary embodiment, an imaging apparatus is exemplified as the image processing apparatus to which the present invention is applied. However, the present invention is not limited to the imaging apparatus. The present invention can be applied to either one of the imaging apparatus which can capture still images or the imaging apparatus which can capture moving images. The present invention can also be applied to the image forming apparatus, e.g., a printer, for acquiring image data from outside to process the image data and an information processing apparatus, e.g., apersonal computer.

Other Embodiments

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-295434 filed Dec. 25, 2009, which is hereby incorporated by reference herein in its entirety.

What is claimed is:

1. A method of image processing comprising:
acquiring image data generated by an image sensor;
generating a hue histogram of the image data by a hue histogram generation unit;
discriminating, by a scene discrimination control unit, whether an image of the image data is a vivid color scene based on a discrimination threshold that is set according to a number of hues of which frequency is larger than a predetermined threshold in the hue histogram; and
outputting, by a scene discrimination unit, a discrimination result by comparing a chroma of the image data with the discrimination threshold.

2. The method of image processing according to claim 1, wherein, in a case where the image of the image data is the vivid color scene according to the discrimination result, the chroma of the image data is corrected to rise in comparison with a case where the image of the image data is not the vivid color scene.

3. The method of image processing according to claim 1, wherein, as the number of hues of which frequency in the hue histogram is larger than the predetermined threshold becomes less, the discrimination threshold makes discrimination of the vivid color scene less likely.

4. A method of image processing comprising:
acquiring image data from an image sensor;
generating a hue histogram of the image data by a hue histogram generation unit;
discriminating, by a scene discrimination control unit, whether an image of the image data is a vivid color scene based on a discrimination condition that is set according to the number of hues of which frequency is larger than a predetermined threshold in the hue histogram; and
outputting the discrimination result by a scene discrimination unit,
wherein the discrimination condition determines that the image is the vivid color scene in a case where the chroma of the image data is higher than a predetermined value; and
wherein the predetermined value is a first chroma threshold in a case where the number of hues of which frequency in the hue histogram is larger than the predetermined threshold is a first number, and the predetermined value is a second chroma threshold that is larger than the first chroma threshold in a case where the hue histogram is a second number which is smaller than the first number.

5. The method of image processing according to claim 1:
wherein the discriminating step divides the image of the image data into a plurality of blocks and, in a case where a number of blocks having a chroma larger than a second chroma threshold is larger than a predetermined number, discriminates the image as the vivid color scene; and
wherein the predetermined number is a first block threshold in a case where the number of hues of which frequency in the hue histogram is larger than the predetermined threshold is the first number and the predetermined number is a second block threshold larger than the first block threshold in a case where the number of hues is the second number smaller than the first number.

6. The method of image processing according to claim 1:
wherein the discriminating step determines whether the image is the vivid color scene by using a chroma of a corrected image data after correcting a chroma of the image data according to the number of hues of which frequency in the hue histogram is larger than the predetermined threshold; and
wherein a correction amount of the chroma of the image data is a first correction amount in a case where the number of hues is a first number and the correction amount of the chroma of the image data is a second correction amount larger than the first correction amount in a case where the number of hues is a second number smaller than the first number.

7. A method of image processing comprising:
acquiring image data generated by an image sensor; and
generating a hue distribution of the image data by a hue histogram generation unit;
wherein a discrimination threshold is set by a scene discrimination control unit according to a degree of spreading of a color distribution in the hue distribution and, whether an image of the image data is a vivid color scene is determined based on the discrimination threshold; and
wherein a discrimination result obtained by comparing a chroma of the image data with the discrimination threshold is output by a scene discrimination unit.

8. The method of image processing according to claim 7:
wherein the generated hue distribution is a hue histogram; and
wherein the degree of the spreading of the color distribution in the hue distribution corresponds to any one of a number of hues having a frequency in the hue histogram that is not zero, a percentage of a frequency included in a peak of the hue histogram, and a width of a peak of the hue histogram.

9. The method of image processing according to claim 7, wherein the discrimination threshold is set to make a discrimination of the image of the image data as the vivid color scene less likely, as a degree of spreading of a chroma distribution or a luminance distribution of the image data is narrower.

10. The method of image processing according to claim 7, further comprising:
extracting a background area excluding an area where main object of the image data exists; and
calculating the degree of the spreading of the color distribution by using only the background area.

11. An apparatus of image processing comprising:
an acquiring unit configured to acquire image data;
a generation unit configured to generate a hue histogram of the image data;
a discrimination unit configured to set a discrimination threshold according to a number of hues of which frequency is larger than a predetermined threshold in the hue histogram and discriminate whether an image of the image data is a vivid color scene by comparing a chroma of the image data to the discrimination threshold.

12. An apparatus of image capturing comprising:
an image pickup unit configured to capture an object and output image data of the object;
a generation unit configured to generate a hue histogram of the image data;
a discrimination unit configured to set a discrimination threshold according to a degree of spreading of a color distribution in the hue histogram and discriminate whether an image of the image data is a vivid color scene by comparing a chroma of the image data to the discrimination threshold.

13. The method of image processing according to claim 1, wherein a chroma of the image data is corrected according to the discrimination result output according to the outputting operation.

14. The method of image processing according to claim 7, wherein a chroma of the image data is corrected according to the discrimination result output according to the outputting operation.

15. The apparatus of image processing according to claim 11, wherein a chroma of the image data is corrected according to the discrimination.

16. The apparatus of image capturing according to claim 12, wherein a chroma of the image data is corrected according to the discrimination.

17. The apparatus of image capturing according to claim 12, further comprising:
   a display unit configured to display an image of the captured image data and the discrimination result.

18. The apparatus of image capturing according to claim 12, further comprising:
   a recording unit configured to record the captured image data in a recording medium and attach the discrimination result to a header of the captured image data.

* * * * *